United States Patent [19]

Watanabe

[11] Patent Number: 4,874,054
[45] Date of Patent: Oct. 17, 1989

[54] CONTROL IN A VEHICLE FOUR WHEEL STEERING SYSTEM

[75] Inventor: Kenichi Watanabe, Hiroshima, Japan

[73] Assignee: Mazda Motor Corporation, Hiroshima, Japan

[21] Appl. No.: 89,552

[22] Filed: Aug. 26, 1987

[30] Foreign Application Priority Data

Aug. 27, 1986 [JP] Japan .................................. 61-201085
Aug. 27, 1986 [JP] Japan .................................. 61-201086
Aug. 27, 1986 [JP] Japan .................................. 61-201087

[51] Int. Cl.⁴ ............................................. B62D 5/06
[52] U.S. Cl. ........................................ 180/140; 280/91
[58] Field of Search ...................... 180/140, 142, 141; 280/91; 364/424.01

[56] References Cited

U.S. PATENT DOCUMENTS

| | | | |
|---|---|---|---|
| 2,910,131 | 10/1959 | Krotz | 180/234 |
| 4,175,638 | 11/1979 | Christensen | 180/140 |
| 4,313,514 | 2/1982 | Furukawa et al. | 108/143 |
| 4,645,025 | 2/1987 | Ohe et al. | 180/140 X |

FOREIGN PATENT DOCUMENTS

| | | | |
|---|---|---|---|
| 55-91457 | 7/1980 | Japan . | |
| 60-4468 | 1/1985 | Japan | 280/91 |
| 60-135370 | 7/1985 | Japan | 280/91 |
| 60-148769 | 8/1985 | Japan . | |
| 60-259571 | 12/1985 | Japan | 180/140 |
| 61-113562 | 5/1986 | Japan | 180/140 |
| 2148222 | 5/1985 | United Kingdom | 280/91 |

*Primary Examiner*—John A. Pekar
*Attorney, Agent, or Firm*—Fleit, Jacobson, Cohn, Price, Holman & Stern

[57] ABSTRACT

A vehicle four wheel steering system including a front wheel steering mechanism for steering the front wheels in response to an operation of a manually operated steering member, a rear wheel steering mechanism for steering rear wheels in response to a steering movement of the front wheel. A control unit is provided for changing the steering ratio of the rear wheel steering angle to the front wheel steering angle in accordance with the vehicle speed. The steering ratio is further modified so that the rear wheel steering angle is added with a modification angle in the direction opposite to the direction of steering of the front wheel, the modification angle being increased in response to an increase in the side force on the vehicle.

15 Claims, 7 Drawing Sheets 4,874,054

CONTROL IN A VEHICLE FOUR WHEEL STEERING SYSTEM

BACKGROUND OF THE INVENTION

1. Field of the Invention

The present invention relates to a vehicle steering system, and more particularly to a vehicle four wheel steering system. More specifically, the present invention pertains to a vehicle four wheel steering system in which the steering angle ratio between the front and rear wheels is changed in accordance with the vehicle operating conditions such as the vehicle speed.

2. Description of the Prior Art

In the field of motor vehicles, the concept of four wheel steering is old. It has also been known to steer the rear wheels in different ways with respect to the front wheels depending on the vehicle operating condition such as the vehicle speed. For example, the U.S. Pat. No. 2,910,131 discloses a vehicle four wheel steering system in which the rear wheels are steered together with the front wheels. The U.S. patent teaches to steer the rear wheels in the direction opposite to the direction in which the front wheels are steered when the vehicle speed is low but to steer the rear wheels in the same direction as the direction in which the front wheels are steered when the vehicle speed is high.

Japanese patent application 53-163678 which has been filed on Dec. 29, 1978 and disclosed on July 11, 1980 under the disclosure number 55-91457 discloses a vehicle four wheel steering system in which the steering angle ratio, that is, the ratio of the steered angle of the rear wheels to the steered angle if the front wheels is changed in accordance with the vehicle speed so that the rear wheels are steered in the direction opposite to the direction of steering of the front wheels under a low vehicle, speed range and in the in the same direction as the direction of steering of the front wheels. This Japanese patent application corresponds to the U.S. Pat. No. 4,313,514 issued to Y. Furukawa et al on Feb. 2, 1982.

It should be noted that the known four wheel steering systems do not take into account the road conditions on which the vehicle is running. In the prior art steering systems described above, therefore, desirable steering characteristics cannot be obtained under slippery road conditions if the system is designed to provide an optimum result in a dry road condition. In view of the above problems, the Japanese patent application 59-4597 filed on Jan. 13, 1984 and disclosed for public inspection on Aug. 6, 1985 under the disclosure number 60-148769 proposes to control the four wheel steering system in accordance with the road condition such as the coefficient of friction between the vehicle wheels and the road on which the vehicle is running.

According to the proposal by the Japanese patent application, the coefficient of friction is detected as an example in terms of the lateral acceleration produced in the vehicle body during a cornering of the vehicle and the steered angle of the vehicle. There is further taught that under a low frictional coefficient such as in an icy road and where the vehicle is to be steered to conduct a lane change on a straight path, the rear wheel steering signal is modified by being added with a modification signal which produces in the rear wheels a steering movement in the direction of steering of the front wheels. This will mean that the rear wheel steering angle will be increased where the rear wheels are steered in the same direction as the direction of steering of the front wheels whereas the rear wheel steering angle will be decreased where the rear wheel steering direction is opposite to the direction of steering of the front wheels. The teachings in the Japanese patent application are such that the strength of the modification signal is determined so that the fish tailing of the vehicle during the lane change can be avoided.

The Japanese patent application further teaches to determine the modification signal so that the rear wheels are given with a steering angle in the direction opposite to the direction of steering of the front wheels in case where the frictional coefficient is low and the vehicle is to be passed through a sharp turn. The amount of the modification signal is determined so that the front wheels do not lose the road gripping power.

It should however be noted that the teachings in the Japanese patent are not precise and does not describe how the modification signal is determined under various road conditions. It should further be pointed out that the Japanese patent application teaches to provide manual means for determining the direction of the modified steering movement of the rear wheels. In other words, according to the teachings by the Japanese patent application, the driver has to judge as to whether the vehicle is in the lane change condition wherein the rear wheel steering shall be modified by being added with an additional steering angle in the direction of steering of the front wheel or in the sharp cornering condition wherein the rear wheel steering shall be modified by being added with an additional steering angle in the opposite direction of the steering of the front wheel. Further, the driver has to operate the manual means based on his judgement so that a desired modification is made on the rear wheel steering.

Another problem in the known four wheel steering system is that in a case where the steering ratio between the front wheel steering angle and the rear wheel steering angle is controlled solely in accordance with the vehicle speed, the rear wheel steering direction is changed from the direction opposite to the direction of the steering of the front wheels to the direction which is the same as the steering direction of the front wheels as the vehicle speed is increased in a curved path. This tendency of the vehicle steering characteristics will give the driver an increasingly strong feeling of under steering.

SUMMARY OF THE INVENTION

It is therefore an object of the present invention to provide a vehicle four wheel steering system in which the rear wheel steering is controlled in accordance with the road conditions.

Another object of the present invention is to provide a vehicle four wheel steering system in which a stable steering can be ensured when the front wheel steering angle is small and the steering angle of the rear wheels is modified depending on the frictional coefficient of the road.

A further object of the present invention is to provide a vehicle four wheel steering system in which optimum steering characteristics can be obtained irrespective of the road conditions.

A still further object of the present invention is to provide a vehicle four wheel steering system in which an intensified under steering tendency can be avoided even when the vehicle speed is increased in a cornering operation.

Yet further object of the present invention is to provide a vehicle four wheel steering system in which the rear wheel steering is automatically modified so that a stable steering is ensured in for example a lane change under a relatively high speed operation on a relatively straight path and an excessively strong under steering characteristics can be avoided in an operation through a sharp corner.

According to the present invention, the above and other objects can be accomplished by a vehicle four wheel steering system including a manually actuated steering member, front wheel steering means for producing a steering angle in each of front wheels in response to an actuation of the steering member, rear wheel steering means for producing a steering angle in each of rear wheels in response to a steering movement of the front wheel, said rear wheel steering means including steering ratio setting means for determining a steering ratio of the steering angle of the rear wheel to the steering angle of the front wheel in accordance with a vehicle operating condition, the improvement comprising side force detecting means for detecting a side force produced in the vehicle in a transverse direction of the vehicle and producing a side force signal, steering ratio setting means being responsive to said side force signal to modify the steering ratio so that the steering angle of the rear wheel is added with a modification steering angle which is in a direction opposite to the direction of steering of the front wheel and which increases as the side force increases.

According to a preferable mode of the present invention, the steering ratio setting means includes memories of a plurality of patterns of steering ratio characteristics which determine the steering ratio in accordance with the vehicle speed and one of the patterns is selected in accordance with the side force. In another mode, the steering ratio setting means includes a memory of a single pattern of steering ratio which determines the steering ratio in accordance with the vehicle speed and the steering ratio as determined by the memory is modified in accordance with the side force.

According to the present invention, the modification of the steering ratio is made in accordance with the side force produced in the vehicle so that it is possible to discriminate a high speed lane change operation from a sharp corner turn. More specifically, under a high speed lane change operation, the side force produced in the vehicle is relatively small so that the modification steering angle applied to the rear wheels is small and the rear wheels may be steered in the direction which is the same as the direction of steering of the front wheels in an angle sufficient to prevent unstable conditions such as a fish tailing. In a sharp corner turn, a substantial side force is produced so that the rear wheels are given with a relatively large modification steering angle to thereby suppress the tendency of understeering. When the vehicle is accelerated during cornering, the side force tends to increase so that the modification steering angle is gradually increased to thereby suppress an increase in the tendency of under steering.

The above and other objects and features of the present invention will become apparent from the following descriptions of preferred embodiments taking reference to the accompanying drawings.

DESCRIPTION OF THE PREFERRED EMBODIMENTS

Figure 1:
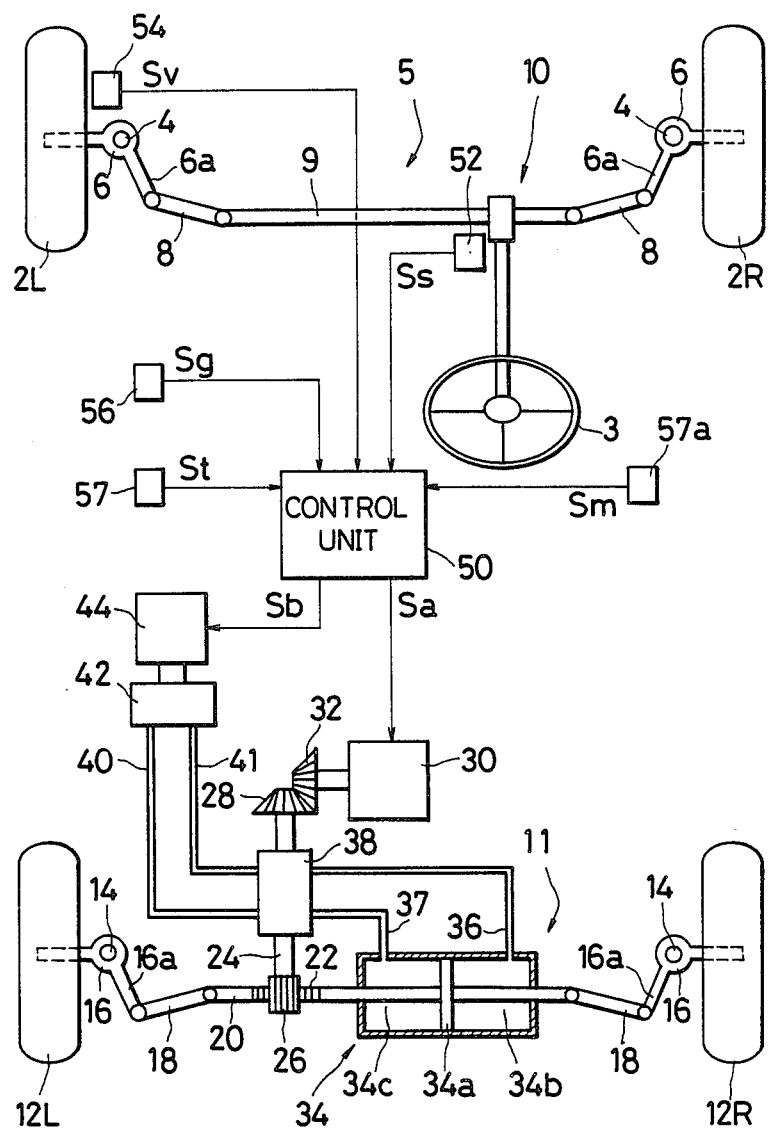
FIG. 1 is a diagrammatical plan view of a vehicle four wheel steering system in accordance with one embodiment of the present invention.

Referring to the drawings, particularly to FIG. 1, there is shown a vehicle four wheel steering system including a front left wheel 2L, a front right wheel 2R, a rear left wheel 12L and a rear right wheel 12R. For the front wheels 2L and 2R, there is provided a front wheel steering mechanism 5. For providing the front wheel steering mechanism 5, each of the front wheels 2L and 2R has a knuckle member 6 which is pivotably supported by a pin 4. The knuckle member 6 has a knuckle arm 6a which is connected with one end of a tie rod 8 which is in turn connected at the other end with one end of a rack shaft 9. The rack shaft 9 extends in a transverse direction of the vehicle and is provided with a steering gear mechanism 10 which is of a conventional rack-and-pinion type operated by a manual steering handle wheel 3. It will therefore be understood that an actuation of the steering wheel 3 produces an axial movement of the rack shaft 9 which then produces corresponding movements in the tie rods 8 to thereby rotates the knuckle members 6. Thus, the front wheels 2L and 2R are steered in a direction corresponding to the direction of actuation of the steering wheel 3.

Similarly, a rear wheel steering mechanism 11 is provided for steering the rear wheels 12L and 12R. For the purpose, each of the rear wheels 12L and 12R is provided with a knuckle member 16 which is supported by a pivot pin 14. The knuckle member 16 has a knuckle arm 16a which is connected with one end of a tie rod 18 which is in turn connected with one end of a rack shaft 20. The rack shaft 20 is formed with a rack 22 which is in engagement with a pinion 26 provided at one end of a pinion shaft 24. The pinion shaft 24 is provided at the other end with a bevel gear 28 which is in engagement with a bevel gear 32 provided on an output shaft of a pulse motor 30. It will be understood that an actuation of the pulse motor 30 produces a rotation of the pinion shaft 24 so that the rack shaft 20 is longitudinally shifted to cause a steering movements in the rear wheels 12L and 12R.

The rack shaft 20 is passed through a power cylinder 34 and provided with a piston 34a which is disposed in the power cylinder 34. The piston 34a divides the inside of the cylinder 34 into chambers 34b and 34c. The chambers 34b and 34c are connected with a hydraulic pump 42 through a control valve which is provided on the pinion shaft 24. More specifically, the chamber 34b is connected with a line 36 which leads to the control valve 38 and the chamber 34c is connected with a line 37 which leads to the control valve 38. The control valve 38 is connected with the hydraulic pump 42 through a pressure line 40 and a return line 41. The hydraulic pump 42 is driven by a motor 44.

The control valve 38 is actuated by the pinion shaft 24 so that when the pinion shaft 24 is rotated in one direction to steer the rear wheels 12L and 12R for example in clockwise direction the valve 38 is shifted to connect the pressure line 40 to the line 36 leading to the chamber 34b and the return line 41 to the line 37 leading to the chamber 34c to assist the operation of the pinion shaft 24. When the pinion shaft 24 is rotated in the other direction to steer the rear wheels 12L and 12R in the counterclockwise direction, the valve 38 connects the pressure line 40 to the line 37 leading to the chamber 34c and the return line 41 to the line 36 leading to the chamber 34b to thereby assist the operation of the pinion shaft 24.

A control unit 50 is provided for controlling the operation of the pulse motor 30 and the pump driving motor 44. The steering system is provided with a front wheel steering angle detector 52, a vehicle speed detector 54 and a side force detector 56. The front wheel steering angle detector 52 is provided in the front wheel steering mechanism 10 and produces a steering angle signal Ss representing the steering angle of the front wheels. The vehicle speed detector 54 may be provided on an output shaft of the vehicle transmission and produces a vehicle speed signal Sv which represents the vehicle speed. The side force detector 56 may be a known type of acceleration detector which is mounted to detect a sideward acceleration on the vehicle and produces a side force signal Sg representing the side force on the vehicle. There are further provided driving torque detector 57 for detecting the vehicle driving torque and producing a driving torque signal St. The vehicle is further provided with a mode selecting switch 57a which is of a manually operated type and has a normal mode position and a sporty mode position. The switch 57a produces a mode signal Sm. The signals Ss, Sv, Sg, St and Sm are applied to the control unit 50 which then produces output signals Sa and Sb for operating the motors 30 and 44, respectively.

Figure 2:
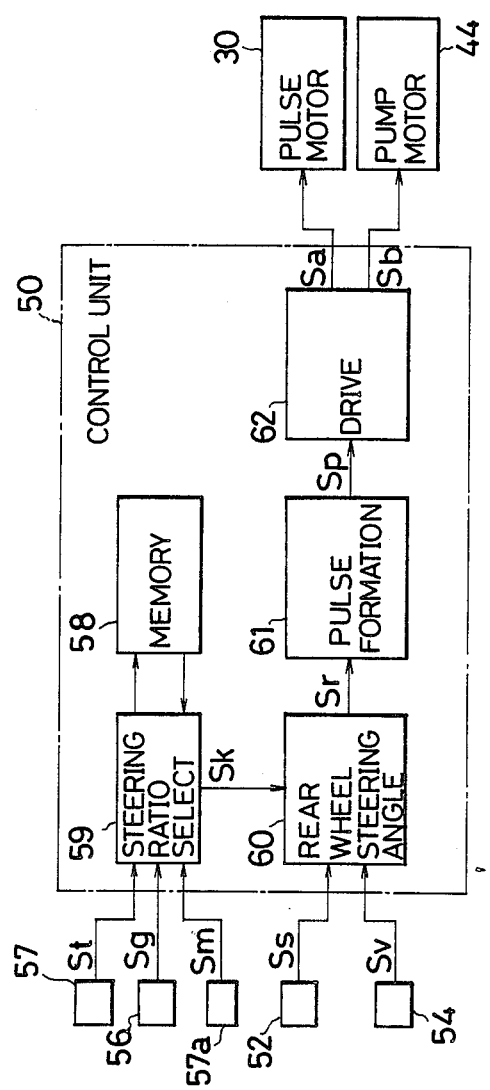
FIG. 2 is a block diagram showing the details of the control unit.
Figure 3:
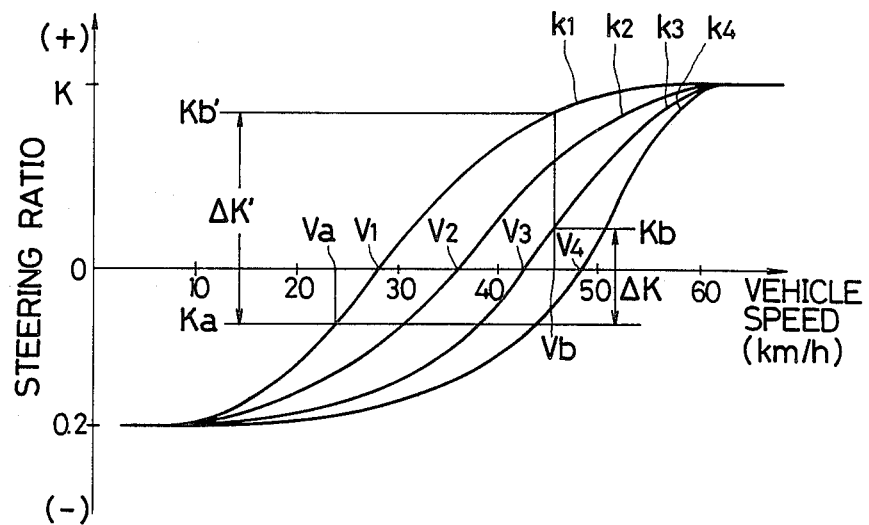
FIG. 3 is a diagram showing an example of the steering ratio control patterns.

Referring now to FIG. 2, it will be noted that the control unit 50 includes a memory 58 which memorizes a plurality of steering angle ratio characteristics as shown in FIG. 3. A selecting circuit 59 is connected with the memory 58 for selecting an appropriate one of the steering ratio characteristics memorized in the memory 58. The selecting circuit 59 receives the signals Sg, St and Sm from the detectors 56, 57 and 57a and select an appropriate one of the steering ratio characteristics in accordance with the signals Sg, St and Sm. the selecting circuit 59 then produces an output signal Sk which corresponds to the selected one of the steering ratio characteristics.

The output of the selecting circuit 59 is connected with a rear wheel steering angle calculating circuit 60 which calculates the steering angle of the rear wheels 12L and 12R. The rear wheel steering angle calculating circuit 60 is connected with the detectors 52 and 54 to receive the signals Ss and Sv therefrom. The circuit 60 performs a calculation to obtain the steering angle required for the rear wheels based on the front wheel steering angle Ss, the vehicle speed Sv and the selected steering ratio characteristics Sk. The circuit 60 thus produces an output signal Sr which represents the required steering angle of the rear wheels. The rear wheel steering angle signal Sr is applied to a pulse forming circuit 61 which converts the signal Sr into a pulse signal Sp which is then applied to a driving circuit 62. The driving circuit 62 functions to produce driving signals Sa and Sb which are respectively applied to the motors 30 and 44. It will therefore be understood that the control unit functions to operate the pulse motor 30 to thereby steer the rear wheels 12L and 12R to the direction and the angle so that the selected steering angle ratio is accomplished. The control unit 50 may not necessarily be constituted by discrete circuits as described but may be substituted by an appropriately programmed microcomputer.

Referring now to FIG. 3, it will be noted that the memory 58 has a memory of four different patterns K1, K2, K3 and K4 of the steering ratio. The pattern K2 is shifted as compared with the pattern K1 toward the high vehicle speed side. This will mean that the steering ratio is smaller in the pattern K2 than in the pattern K1. In other words, the steering angle of the rear wheel in the pattern K2 is modified as compared with that in the pattern K1 by being added with a modifying angle which is in the direction opposite to the direction of steering of the front wheel. Similarly, the pattern K3 is shifted toward the high vehicle speed side as compared with the pattern K2. The pattern K4 is shifted with respect to the pattern K3 toward the high vehicle side.

According to the pattern K1, the steering ratio takes a negative value when the vehicle speed is lower than the value V1 so that the rear wheels are steered in the direction opposite to the direction of the steering of the front wheels. The rear wheels are however steered in the direction which is the same as the direction of steering of the front wheels when the vehicle speed is higher than the value V1. At the vehicle speed V1, the rear wheels are not steered. In the pattern K2, this critical speed is increased to the value V2. Similarly, the zero steering ratio speed is increased to V3 in the pattern K3 and to V4 in the pattern K4.

Comparing the pattern K1 with the pattern K2, the steering angle of the rear wheels in the pattern K2 is considered as being added with a modification angle in the direction opposite to the direction of steering of the front wheel when the comparison is made on the same vehicle speed. The same can be applied to the relation between the patterns K2 and K3 as well as the relation between the patterns K3 and K4.

According to the illustrated embodiment, the patterns K1, K2 and K3 are used for the rear wheel steering control under the normal mode control which is selected by the mode selecting switch 57a. The patterns K1, K3 and K4 are used under the sporty mode. More specifically, under the normal mode, the pattern K1 is used for determining the steering ratio in accordance with the vehicle speed when the side force on the vehicle is below a predetermined value and the driving torque is also below a predetermined value. When the side force is above the predetermined value but the driving torque is below the predetermined vale, the pattern K2 is used. When both the side force and the driving torque are above the predetermined values, the pattern K3 is used for determining the steering ratio.

Under the sporty mode operation, the pattern K1 is used for determining the steering ratio when both the side force and the driving torque are below the predetermined values. When the side force is above the predetermined value but the driving torque is below the predetermined value, the pattern K3 is used. However, when both the side force and the driving torque are above the predetermined values, the pattern K4 is used for determining the steering ratio.

In operation, the side force signal Sg is applied to the steering ratio selecting circuit 59 so that a judgement is made by the circuit 59 as to whether the side force represented by the signal Sg is greater than a first predetermined value F1. When it is judged that the side force is smaller than the predetermined value F1, it is interpreted that the frictional coefficient is relatively small so that the pattern K1 is selected by the circuit 59. Thus, the circuit 59 produces a signal Sk which corresponds to the pattern K1 and the signal Sk is applied to the calculating circuit 60. The circuit 60 then calculates the steering angle of the rear wheel based on the steering ratio as obtained from the pattern K1 and the vehicle speed Sv, and on the front wheel steering angle signal Ss from the steering angle detector 52. The circuit 60 thus functions to produce the rear wheel steering angle signal Sr which is then applied to the pulse signal forming circuit 61. The circuit 61 produces pulse signals Sp corresponding to the signal Sr and the signals Sp are applied to the driving circuit 62 which produces signals Sa and Sb for operating the motors 30 and 44.

Under this operating condition, the rear wheels 12L and 12R are steered in accordance with the pattern K1 so that the rear wheels are steered in the direction opposite to the direction of steering of the front wheels 2L and 2R when the vehicle speed is lower than the value V1 to provide a relatively sharp turning property. When the vehicle speed is higher than the value V1, the rear wheels are steered in the direction which is the same as the direction of the steering of the front wheels to thereby provide a relatively stable steering property.

When it is judged that the side force is greater than the first predetermined value F1, the selecting circuit 59 reads the signals St and Sm which are also applied to the circuit 59 from the detector 57 and the manual switch 57a. If the normal mode is selected by the switch 57a and the driving torque signal St is smaller than a predetermined value T, the pattern K2 is selected so that the signal Sk corresponding to the pattern K2 is applied to the circuit 60. The rear wheel steering under the pattern K2 is such that, when compared with the steering under the pattern K1, the steering angle of the rear wheel is modified by being added with a modification angle in the direction opposite to the direction of steering of the front wheel, the modification angle being determined by the difference between the steering ration as obtained by the patterns K1 and K2 under the same vehicle speed. In the operation with the pattern K2, the rear wheels are steered in the direction opposite to the direction of steering of the front wheels with the vehicle speed lower than the value V2 which is higher than the value V1. When the vehicle speed is higher than the value V2, the rear wheels are steered in the direction which is the same as the direction of steering of the front wheels. It will therefore be understood that under the steering control by the pattern K2 an over-steering tendency is provided as compared with the control by the pattern K1.

When the side force increases further beyond a second predetermined value F2 which is greater than the first mentioned predetermined value F1 with the driving torque smaller than the aforementioned predetermined value T, the pattern K3 is selected and a similar control is carried out. It will be noted in FIG. 3 that in the pattern K3 the rear wheels 12L and 12R are steered in the direction opposite to the direction of steering of the front wheels 2L and 2R when the vehicle speed is lower than a value V3 which is greater than the value V2. With the vehicle speed greater than the value V3, the rear wheels 12L and 12R are steered in the direction which is the same as the direction of steering of the front wheels 2L and 2R. It will be understood that with the control under the pattern K3, the over-steering tendency is strengthened or the under-steering tendency is weakened as compared with the control under the pattern K2.

In case where the vehicle is accelerated in cornering, the side force may at first be relatively small so that the control is carried out with the pattern K1 providing a relatively strong under-steering property. As the vehicle is accelerated, the centrifugal force on the vehicle increases so that the control pattern is shifted from the pattern K1 to the pattern K2 and then to the pattern K3. Supposing that the vehicle speed is at first Va as shown in FIG. 3, the steering ratio control is made with the pattern K1 so that the steering ratio is set to the value Ka. As the vehicle speed increases, there will be a corresponding increase in the side force so that the control pattern is shifted to the pattern K2 and then to the pattern K3. Supposing that the final speed is Vb, the steering ratio under the control pattern is Kb so that there is an overall change in the steering ratio from Ka to Kb. If the control is made based solely on the pattern K1, the steering ratio will be Kb' at the vehicle speed Vb, which is much greater than the ratio Kb under the pattern K3. It will therefore be understood that by shifting the control pattern in accordance with the increase in the side force it becomes possible to suppress an increase in the tendency of the under-steer property during an acceleration in cornering.

Under the normal mode operation, when the side force is greater than the value F1 and the driving torque is greater than the value T, the control pattern K3 is selected. Thus, the under-steering tendency is suppressed with the driving torque greater than the value T than in the case where the driving torque is smaller than the value T. The control pattern K3 is also selected, under the sporty mode, in case where the side force is greater than the value F1 and the driving torque is smaller than the value T. Under the sporty mode, the pattern K4 is selected if the driving torque is greater than the value T and the side force is greater than the value F1. It will therefore be understood that in the sporty mode the under-steering property is more suppressed or the over-steering property is more strengthened than in the normal mode.

Figure 4:
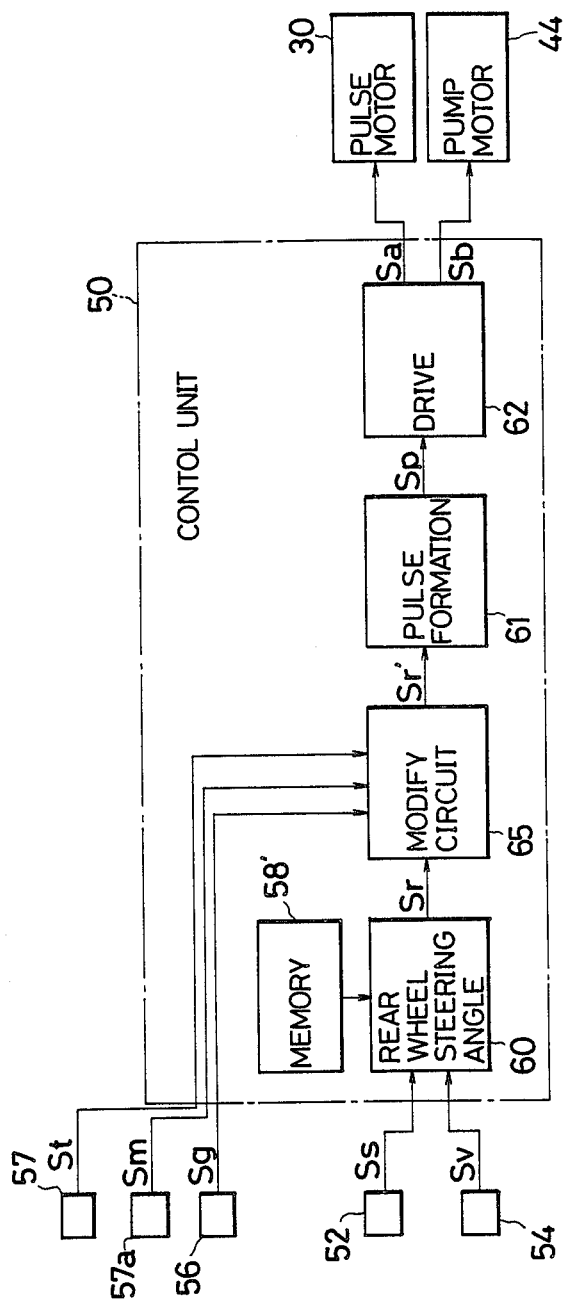
FIG. 4 is a block diagram showing another example of the control unit.

Referring now to FIG. 4, there is shown another embodiment of the present invention in which the control unit 50 includes a memory 58' which memorizes a control pattern corresponding to the pattern K1 shown in FIG. 3. There is provided a rear wheel steering angle calculating circuit 60 which receives signals from the memory 58' and the detectors 52 and 54. Thus, the circuit 60 produces a signal Sr representing the basic rear wheel steering angle corresponding to the actual vehicle speed and the steering angle of the front wheel. The output of the calculating circuit 60 is connected to a modifying circuit 65 which is also connected with the outputs of the detectors 56 and 57 and the mode selecting switch 57a to receive signals Sg, St and Sm. The modifying circuit 65 functions to modify the signal Sr from the circuit 60 in accordance with the signals Sg, St and Sm to produce an output signal Sr'. The signal Sr' from the circuit 65 is applied to a pulse forming circuit 61 which is the same as the circuit 61 in the embodiment of FIG. 2 and produces a signal Sp. The signal Sp is then applied to a driving circuit 62 which produces signals Sa and Sb for driving the motors 30 and 44.

In operation, the calculating circuit 60 makes a calculation based on the steering ratio as obtained from the steering ratio characteristics memorized in the memory 58' and the vehicle speed signal Sv from the speed detector 54 to obtain the rear wheel steering angle corresponding to the front wheel steering angle represented by the signal Ss. The rear wheel steering angle signal Sr thus produced by the circuit 60 is then modified by the circuit 65. The circuit 65 makes a judgement as to whether the side force signal Sg from the detector 56 is greater than a predetermined value F. If the side force signal Sg is smaller than the value F, the signal Sr is not modified and passed to the circuit 61. Thus, the rear wheel is steered in a manner as determined by the control pattern K1 as shown in FIG. 3.

When it is judged that the side force signal Sg is greater than the predetermined value F, the rear wheel steering angle signal Sr is modified by adding a modification angle in the direction opposite to the direction of steering of the front wheel. The modification angle may be determined in accordance with the operating mode and the driving torque. Under the normal mode, the modification angle is smaller than under the sporty mode. In case where the driving torque is greater than a predetermined value T, the modification angle is larger than in a case where the driving torque is smaller than the predetermined value T. For example, the modification may be made when the driving torque is lower than the value T and the operation is made under the normal mode by determining the steering ratio in accordance with the pattern K2. Further, the modification may be made when the driving torque is higher than the value T and the operation is made under the normal mode by determining the steering ratio in accordance with the pattern K3. Under the sporty mode, the patterns K3 and K4 may be used as in the previous embodiment.

Figure 5:
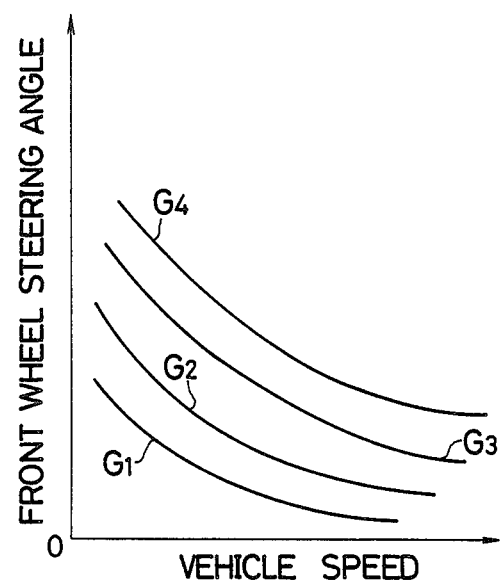
FIG. 5 is a diagram showing the relationship between the front wheel steering angle, the vehicle speed and the side force.

In the previous embodiments, the descriptions have been made with respect to arrangements wherein the detection of the side force is made by using a side force detector. It should however be understood that the side force can be detected through calculations based on the steering angle and the vehicle speed. FIG. 5 shows the relationship between the steering angle and the vehicle speed with the side force taken as a parameter. It will therefore be understood that the side force G can be obtained from the steering angle of the front wheel and the vehicle speed.

Figure 6:
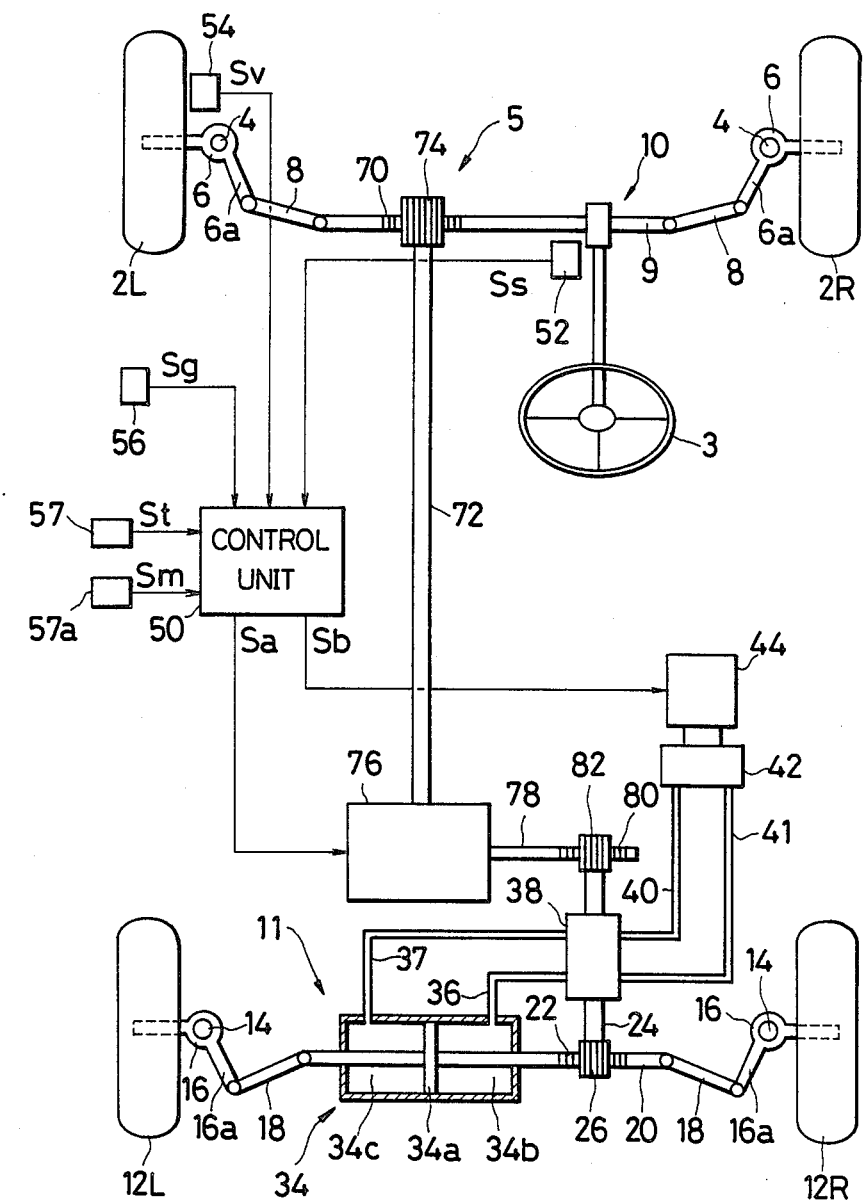
FIG. 6 is a plan view similar to FIG. 1 but showing another embodiment of the present invention; and, FIG. 7 is a fragmentary view showing the details of the steering ratio modifying unit.

Referring further to FIG. 6, there is shown another embodiment of the present invention. In FIG. 6, corresponding parts are shown by the same reference numerals as in FIG. 1 and detailed descriptions will not be repeated. In the embodiment shown in FIG. 6, the rack shaft 9 of the front wheel steering mechanism 10 is formed with rack teeth 70 which are engaged with a pinion 74 provided on one end portion of a longitudinally extending transfer rod 72. The other end of the transfer rod 72 is connected with a steering ratio changing mechanism 76. The mechanism 76 has a slidable member 78 which is slidable in the transverse direction of the vehicle. The slidable member 78 is formed with rack teeth 80 which are engaged with a pinion 82 provided at one end a pinion shaft 24. The pinion shaft 24 is provided at the other end with a pinion 26 which is engaged with rack teeth 22 formed on the rear wheel steering rod 20.

Figure 7:
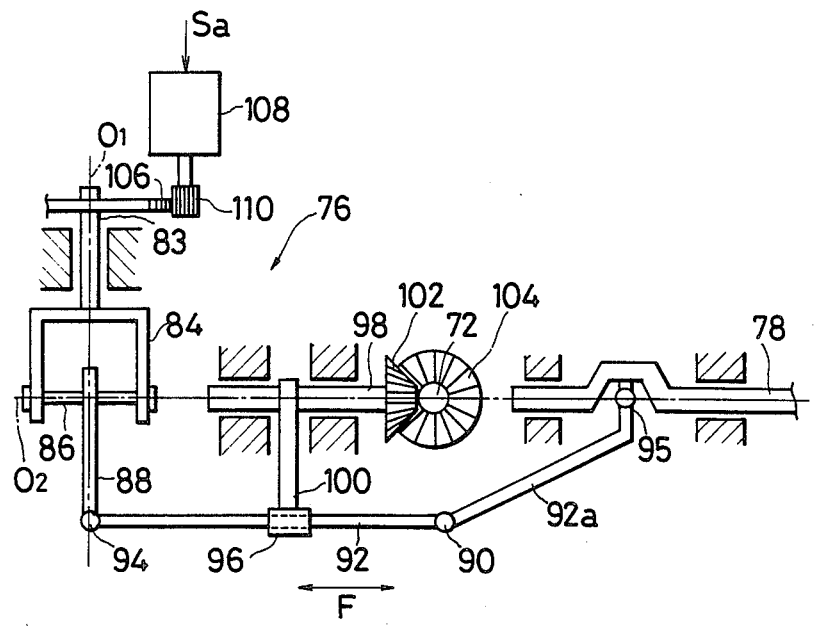

In FIG. 7, there are shown detail of the steering ratio changing mechanism 76. The mechanism 76 includes a vertical shaft 83 which is rotatable about a vertical axis $O_1$ and provided at one end with a bifurcated holder 84. The holder 84 is attached to one end of an arm 88 by means of a pin 86 which has an axis perpendicularly intersecting the axis $O_1$ It will therefore be understood that the arm 88 swings about the axis of the pin 86 defining a plane of the swinging movement which is perpendicular to the axis of the pin 86. The holder 84 is rotatable about the axis $O_1$ so that the axis of the pin 86 makes an angle with respect to a transverse axis $O_2$ of the vehicle, the angle being changed in response to a rotation of the holder 84.

The arm 88 is connected at the other end through a ball joint 94 with one end of a link 92 which is connected at the other end through a ball joint 90 with one end of a second link 92a. The slidable member 78 is arranged with its axis aligned with the transverse axis $O_2$. The other end of the link 92a is connected through a ball joint 95 with the slidable member 78. The link 92 is axially slidably supported by means of a tubular member 96 which is provided at one end of a swingable arm 100. The other end of the swingable arm 100 is connected with a rotatable shaft 98 having one end provided with a bevel gear 102 which is in meshing engagement with a bevel gear 104 provided at the rear end of the transfer shaft 72.

It will therefore be understood that when the transfer shaft 72 is rotated in response to a steering movement the tubular member 96 is moved along an arcuate path having a center of arc at the axis of the shaft 98. In case where the plane of the swinging movement of the arm 88 is inclined with respect to the plane perpendicular to the axis $O_2$, the swinging movement of the tubular member 96 produces an axial movement of the link 92 as shown by an arrow F in FIG. 7. Thus, the slidable member 78 is axially shifted by an amount which is determined by the angle of inclination of the plane of swinging movement of the arm 88.

In order to determine the angle of inclination of the plane of swinging movement of the arm 88, the shaft 83 is provided with a sector gear 106 which is engaged with a pinion 110 provided at an end of an output shaft of a motor 108 which is operated by the signal Sa.

In operation, the steering ratio is determined in accordance with the signals Ss, Sv, Sg and St from the detectors 52, 54, 56 and 57, respectively, and the signal Sm from the mode selecting switch 57a. The signal Sa is then produced based on these signals so that the angle of inclination of the plane of the swinging movement of the arm 88 is appropriately determined. A rotation of the transfer shaft 72 is transmitted through the bevel gears 104 and 102 to the shaft 98 to the arm 100 to swing the same. The swinging movement of the arm 100 causes an axial shifting movement of the slidable member 78 due to the inclination of the plane of swinging movement of the arm 88 with respect to the plane which is perpendicular to the transverse axis $O_2$. The amount of the axial shifting movement of the slidable member 78 is determined by the angle of inclination of the plane of swinging movement of the arm 88.

The axial shifting movement of the slidable member 78 causes a rotation of the pinion shaft 24 and the rotation of the pinion shaft 24 is converted into an axial movement of the rod 20. Thus, the rear wheels 12L and 12R are steered in an appropriate direction by an appropriate angle depending on the side force on the vehicle, the vehicle speed, the driving torque and the steering angle of the front wheel. the rotation of the pinion shaft 24 is assisted by a power assist cylinder 34 which is controlled by a control valve 38 provided on the pinion shaft 24. In other respects, the operation of the embodiment in FIG. 6 is the same as that in the embodiment in FIG. 1.

The invention has thus been shown and described with reference to specific embodiments, however, it should be noted that the invention is in no way limited to the details of the illustrated arrangements but changes and modifications may be made without departing from the scope of the appended claims.

We claim:

1. A vehicle four wheel steering system including a manually actuated steering member, front wheel steering means for producing a steering angle in each of front wheels in response to an actuation of the steering member, rear wheel steering means for producing a steering angle in each of rear wheels in response to a steering movement of the front wheel, said rear wheel steering means including steering ratio setting means for determining a steering ratio of the steering angle of the rear wheel to the steering angle of the front wheel in accordance with a vehicle operating condition, the improvement comprising side force detecting means for detecting a side force produced in the vehicle in a transverse direction of the vehicle and producing a side force signal, steering ratio modifying means responsive to said side force signal for modifying the steering ratio so that the steering angle of the rear wheel is added with a modification steering angle in a direction opposite to the direction of steering of the front wheel and the modification steering angle increasing as the side force increases.

2. A vehicle steering system in accordance with claim 1 which further includes manual means for changing the modification steering angle manually.

3. A vehicle steering system in accordance with claim 2 in which said manual means is provided with a normal mode and a sporty mode in which a larger value of the modification angle is provided than in said normal mode.

4. A vehicle steering system in accordance with claim 1 in which said steering ratio setting means includes vehicle operating condition detecting means for detecting vehicle operating conditions and modification angle changing means for changing the modification steering angle in accordance with the vehicle operating conditions.

5. A vehicle steering system in accordance with claim 4 in which said vehicle operating condition detecting means includes means for detecting a vehicle driving torque and said modification angle changing means includes means for increasing the modification steering angle as the vehicle driving torque increases.

6. A vehicle steering system in accordance with claim 1 in which said steering ratio modifying means is responsive to a vehicle speed to increase the modification steering angle as the vehicle speed increases.

7. A vehicle steering system in accordance with claim 6 which includes steering angle detecting means for detecting a steering angle of the front wheel, vehicle speed detecting means for detecting the vehicle speed, said steering ratio setting means including electronic controlling means for determining a target steering angle of the rear wheel in accordance with output signals of said steering angle detecting means and said vehicle speed detecting means.

8. A vehicle steering system in accordance with claim 7 in which said controlling means includes memory means for memorizing steering angle ratio characteristics dependent on a vehicle operating condition.

9. A vehicle steering system in accordance with claim 8 in which said memory means has memories of a plurality of steering angle ratio characteristics, said controlling means including selecting means for selecting one of said plurality of steering angle ratio characteristics in accordance with the side force.

10. A vehicle steering system in accordance with claim 9 which further comprises mode selecting manual switch means for selecting one of normal and sporty modes, said memory means having memories of at least three steering angle ratio characteristics, said selecting means including means for selecting a first characteristic among the steering angle ratio characteristics wherein the modification steering angle takes the smallest value among the three steering angle ratio characteristics when the side force is smaller than a predetermined value, selecting a second characteristic among the steering ratio characteristics wherein the modification angle ratio takes the largest value when the side force is larger than the predetermined value and the sporty mode is selected, and selecting a third characteristic among the steering ratio characteristics wherein the modification angle ratio takes a value between the first and second characteristics when the side force is larger than the predetermined value and the normal mode is selected.

11. A vehicle steering system in accordance with claim 9 which further comprises driving torque detecting means for detecting vehicle driving torque, said memory means having memories of at least three steering angle ratio characteristics, said selecting means including means for selecting a first characteristic among the steering angle ratio characteristics wherein the modification steering angle takes the smallest value among the three steering angle ratio characteristics when the side force is smaller than a predetermined value, selecting a second characteristic among the steering ratio characteristics wherein the modification angle ratio takes the largest value when the side force is larger than the predetermined value and the driving torque is smaller than a second predetermined value, and selecting a third characteristic among the steering ratio characteristics wherein the modification angle ratio takes a value between the first and second characteristics when the side force is larger than the predetermined value and the driving torque is larger than the second predetermined value.

12. A vehicle steering system in accordance with claim 9 in which said memory means has memories of four steering ratio characteristics including a first pattern for determining a steering angle ratio in accordance with a vehicle operating condition, a second pattern for determining a steering ratio in accordance with the vehicle operating condition in which the modification steering angle is larger than that in the first pattern, a third pattern for determining a steering ratio in accordance with the vehicle operating condition in which the modification steering angle is larger than that in the second pattern, and a forth pattern for determining a steering ratio in accordance with the vehicle operating condition in which the modification steering angle is larger than that in the second pattern, for determining a steering ratio in accordance with the vehicle operating condition in which the modification steering angle is larger than that in the third pattern, manually operated mode selecting means for selecting one of normal and sporty modes, driving torque detecting means for detecting a vehicle driving torque, said selecting means including means for selecting the first pattern when the side force is smaller than a predetermined value, selecting the second pattern when the side force is larger than the predetermined value under the normal mode and the driving torque is smaller than a second predetermined value, selecting the third pattern when the side force is larger than the first predetermined value under the normal mode and the driving torque is larger than the second predetermined value, selecting the third pattern when the side force is larger than the first predetermined value under the sporty mode and the driving torque is smaller than the second predetermined value, and selecting the forth pattern when the side force is larger than the first predetermined value under the sporty mode and the driving torque is larger than the second predetermined value.

13. A vehicle steering system in accordance with claim 8 in which said control means includes basic steering angle setting means for determining a basic steering angle in accordance with the vehicle operating condition, modifying means for modifying the basic steering angle in accordance with the side force.

14. A vehicle steering system in accordance with claim 13 which includes manual means for manually changing amount of modification by said modifying means.

15. A vehicle steering system in accordance with claim 13 which includes vehicle driving torque detecting means, means for increasing the modification steering angle when the driving torque is larger than a predetermined value.

* * * * *